(12) United States Patent
Vande Berg

(10) Patent No.: US 6,273,447 B1
(45) Date of Patent: Aug. 14, 2001

(54) TRAILER SUPPORT WITH ARTICULATING, FREE CASTERING WHEELS

(76) Inventor: David M. Vande Berg, 317 1/2 4th Ave. SE., Sioux Center, IA (US) 51250

( * ) Notice: Subject to any disclaimer, the term of this patent is extended or adjusted under 35 U.S.C. 154(b) by 0 days.

(21) Appl. No.: 09/220,843

(22) Filed: Dec. 24, 1998

(51) Int. Cl.⁷ .................................................. B60D 1/167
(52) U.S. Cl. ....................................... 280/476.1; 280/408
(58) Field of Search ................................. 280/408, 476.1, 280/411.1

(56) References Cited

U.S. PATENT DOCUMENTS

| | | | |
|---|---|---|---|
| 2,350,624 | * | 6/1944 | McDaniel ........................... 280/476.1 |
| 2,379,170 | * | 6/1945 | McDaniel ........................... 280/476.1 |
| 2,379,265 | * | 6/1945 | Whitmer ............................ 280/476.1 |
| 2,450,215 | * | 9/1948 | Wilson ........................... 280/476.1 X |
| 3,105,704 | * | 10/1963 | Schramm ....................... 280/476.1 X |
| 3,345,081 | | 10/1967 | Hartwig ................................ 280/476 |
| 3,827,723 | * | 8/1974 | Neff et al. ........................... 280/476.1 |
| 3,870,340 | * | 3/1975 | Winter ............................ 280/476.1 X |
| 3,888,515 | | 6/1975 | Winter .................................. 280/476 |
| 4,253,679 | | 3/1981 | Sargent ................................. 280/405 |
| 4,451,058 | * | 5/1984 | Curry ................................. 280/476.1 |
| 4,491,338 | | 1/1985 | Sheldrake ............................. 280/405 |
| 4,504,075 | * | 3/1985 | Dawson ................................ 280/408 |
| 5,098,115 | * | 3/1992 | Haire et al. ........................... 280/408 |
| 5,338,050 | | 8/1994 | Haire et al. ........................ 280/476.1 |
| 5,382,041 | | 1/1995 | Keith ................................ 280/476.1 |
| 5,431,568 | | 7/1995 | White ................................... 280/463 |
| 5,664,796 | | 9/1997 | Huyzers ............................... 280/400 |
| 5,785,330 | | 7/1998 | Shoquist .............................. 280/81.6 |
| 5,823,558 | | 10/1998 | Shoquist ............................ 280/405.1 |
| 5,860,667 | * | 1/1999 | Andre .................................. 280/408 |
| 5,924,716 | * | 7/1999 | Burkhart, Sr. et al. ........... 280/476.1 |

FOREIGN PATENT DOCUMENTS

713216 * 10/1931 (FR) .................................... 280/408

* cited by examiner

Primary Examiner—Kevin Hurley
Assistant Examiner—Andrew J. Fischer
(74) Attorney, Agent, or Firm—Shughart, Thomson & Kilroy P.C.

(57) ABSTRACT

The present invention is a trailer extension support dolly with a frame supported by a pair of articulating, free castering support wheels. The trailer extension support dolly attaches between a trailer and a tow vehicle to at least partially support the tongue weight of the trailer. The trailer extension support dolly is attached to the trailer via a conventional ball and socket and a pair of linkage arms extending from the trailer extension support dolly frame rearward to the trailer hitch bar. Each of the trailer extension dolly support wheels is mounted on a respective stub axle which is attached to an articulating axle support bracket via a swivel mount so that each wheel is allowed to caster during turning operations. In order to provide proper castering while going either in a forward direction or a reverse direction, the angle of each axle support bracket is adjustable so that the stub axle swivel connection can be selectively angled forward or rearward. With this adjustment, the support wheels can be alternatively, respectively positioned to freely caster during either forward or reverse steering operations. In an alternative embodiment, the axle support brackets are pivotably attached to a frame which forms an integral part of the trailer and are adjustable in angle to be freely caster in either forward or reverse directions.

22 Claims, 3 Drawing Sheets

TRAILER SUPPORT WITH ARTICULATING, FREE CASTERING WHEELS

FIELD OF THE INVENTION

This invention pertains to a trailer extension support dolly designed for attachment between a towing vehicle and a trailer to partially support the tongue weight of the trailer. The trailer extension support dolly is equipped with one or more support wheel(s) which are free castering, with each of the support wheels being supported by a stub axle which is attached to a pivotable axle support bracket. A linear actuator is provided for selectively pivoting the axle support bracket(s) to change their castor such that the wheel(s) can be selectively made freely castering in either a forward or reverse direction.

BACKGROUND OF THE INVENTION

There are many types of trailers normally pulled by tow vehicles such as automobiles, pick-up trucks, vans, utility trucks, and motor homes. These trailer types include camper trailers, large travel trailers, livestock trailers, boat trailers, enclosed vehicle trailers, flat trailers on which may be used to transport farm machinery, NASCAR-type racing cars, motorcycles and other such equipment, etc. As trailers have become larger, heavier, and varied in design over the years, the support wheels have been moved ever further rearward. While this trend does make the trailer pull straighter and more stable with less sway, however, the negative aspect of this trend is this movement shifts more of the weight of the trailer and its contents to the hitch, thus increasing the tongue weight load applied to the rear of the towing vehicle.

Although it may be conceded that a certain amount of tongue weight on the hitch may be beneficial for traction in slippery conditions to keep the drive wheels from spinning, it should also be pointed out that increasing the tilting moment around the rear axle of the towing vehicle has the effect of decreasing the traction at the steering wheels as well as causing the headlights too shine in beams far to high to be safe. Also, while many tow vehicles have the power to pull a large load, few have the frame strength to safely support a large trailer tongue load applied to the rearmost section of the tow vehicle frame.

It thus becomes necessary to reduce the trailer tongue weight in some circumstances. A number of attempts have been made to make a load carrying dolly which attaches between the tow vehicle and the trailer. An example of such a trailer dolly is found in U.S. Pat. No. 3,345,081 to Hartwig, which is directed to a dolly with a pair of support wheels and horizontal and vertical shock absorbing springs. The wheels are not free castering. U.S. Pat. No. 4,253,679 to Sargent is directed to a trailer dolly with a pair of support wheels and with the trailer hitch mounted forward of the axis of rotation of the support wheels. Each wheel is attached via an independent torsion spring which is adjustable for different trailer weights. Again, the wheels are not free castering. U.S. Pat. No. 4,491,338 to Sheldrake and U.S. Pat. No. 3,888,515 to Winter are dollies which are securely attached to the tow vehicle frame. These require custom installation on each towing vehicle, and attachment and removal is generally complicated. U.S. Pat. No. 5,664,796 to Huyzers is a "vehicle extender" which uses a "single, castor action, load bearing wheel set" which is attached to the extender via a vertical or angled shaft. U.S. Pat. No. 5,382,041 to Keith uses an arm limited dolly that may also scuff tires on the roadway each time the vehicle is turned beyond arm limits. U.S. Pat. No. 5,338,050 to Haire uses a dolly that locks the dolly wheels in a straight forward position during the backing up procedure forcing the tires to scrub the ground if any turning is required causing excessive tire wear. Finally there is a specialty steering dolly-type exemplified by the U.S. Pat. No. 5,531,468 to White, in which the inventor goes to great lengths to provide a steering dolly for insertion between the towing vehicle and the towed vehicle. Again the load carrying wheels do not freely caster, and the device may also be difficult to handle during backing as may be required for parking or the like. The solutions devised by these patents are generally satisfactory in shifting some of the tongue weight away from the tow vehicle and onto the support dolly. However, backing up trailers equipped with these dollies is very difficult since it essentially amounts to the simultaneous backing of two tandem linked trailers. Even in the case of free castering support wheels, the wheels often tend to "scrub" sideways instead of swiveling freely during backing operations.

It is clear, then, that a need exists for an improved trailer support which accepts some of the tongue weight of a trailer, thus shifting it off of the two vehicle. Such a support should have support wheels which freely caster in either forward or reverse directions.

SUMMARY OF THE INVENTION

The present invention is essentially a trailer extension support dolly in which the frame of the dolly is substantially coupled or connected by fasteners, bonding, glueing, or welding to the frame of the trailer. The trailer extension support dolly frame is supported by a pair of articulating, free castering support wheels. The trailer extension support dolly attaches to a trailer between a tow vehicle and the trailer to at least partially support the tongue weight of the trailer. The trailer extension support dolly can be attached to the trailer via a ball and socket connection coupled with a pair of rods which extend between the trailer extension support dolly frame and the trailer hitch bar. Each of the support wheels is mounted on a respective stub axle which is attached to an articulating axle support bracket via a swiveling knuckle to that each wheel is allowed to caster during turning operations. In order to provide proper castering while going either in a forward direction or a reverse direction, the angle of each axle support bracket is adjustable so that the stub axle swivel connection can be selectively angled forward or rearward. With this adjustment, the support wheels can be alternatively, respectively positioned to freely caster during either forward or reverse steering operations.

OBJECTS AND ADVANTAGES OF THE INVENTION

The objects and advantages of the invention include: providing a trailer extension support dolly which safely removes a portion of the trailer tongue weight from a tow vehicle while functioning in both forward and reverse operations exactly as a standard single axle or closely spaced tandem/triple axle trailer would; providing such a trailer extension support dolly which can be connected between a trailer and tow vehicle; providing such a trailer extension support dolly which includes a frame supported by one or more support wheels; providing such a trailer extension support dolly in which the support wheel(s) are attached to respective stub axles which are, in turn, attached to respective axle supports via swivel mounts so that the wheels are permitted to caster during turning operations; providing such a trailer extension support dolly in which the axle support(s)

are selectively pivotable relative to the trailer extension support dolly frame so that the angle of each axle support relative to the trailer extension support dolly frame can be adjusted; providing such a trailer extension support dolly with a powered adjuster attached to each axle support which allows the axle support(s) to be selectively adjusted between forward and rearward angles relative to the trailer extension support dolly frame such that the attached wheel(s) freely caster in respective reverse or forward directions; and providing such a trailer extension support dolly which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

Figure 1:
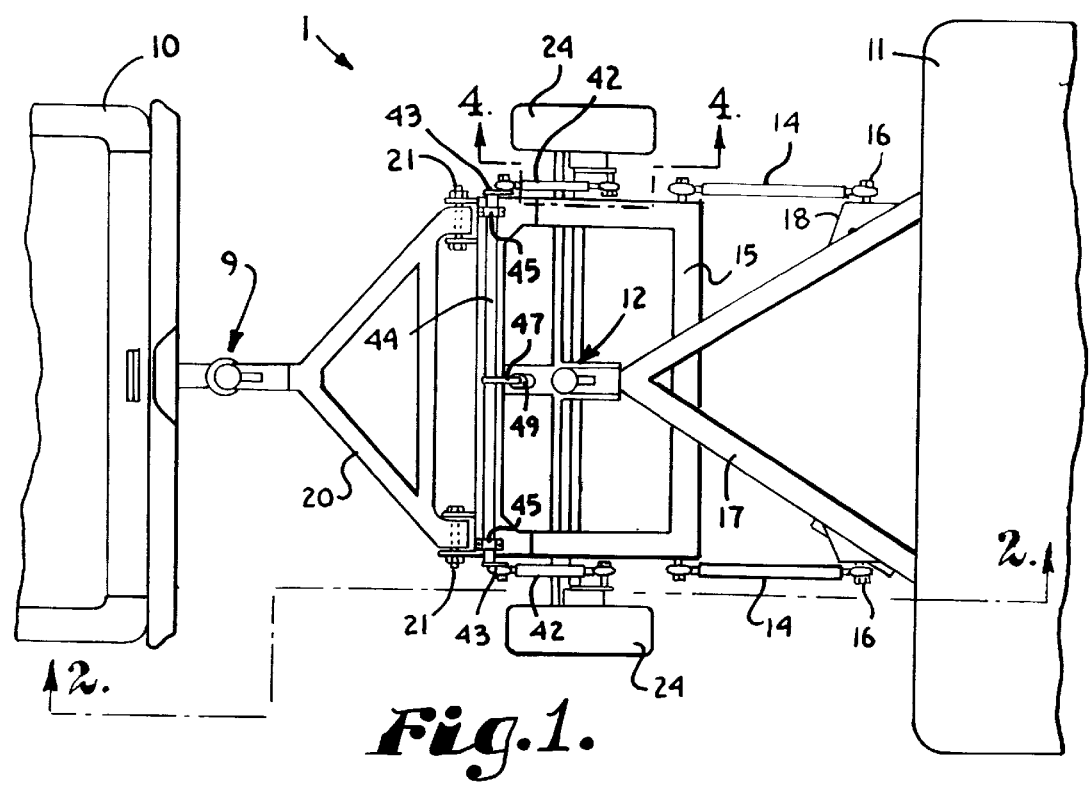
FIG. 1 is a top plan view of a trailer extension support dolly in accordance with the present invention, shown connected to both a trailer and a tow vehicle.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1–5, a trailer extension support dolly in accordance with the present invention is illustrated and indicated generally by reference numeral 1. The trailer extension support dolly 1 is shown connected between a tow vehicle 10 and a pulled trailer 11. The connection between the tow vehicle 10 and the trailer extension support dolly 1 is illustrated as a standard ball and socket hitch 9, however various forms of connection could be made such as hitch pins etc. The connection between the trailer extension support dolly 1 and the trailer 11 is shown as a ball and socket hitch 12 and link arms 14 attached by bolts 16 between a dolly frame 15 and flange extensions 18 on a V-shaped hitch bar 17 on the trailer 11. However, the trailer extension support dolly 1 could be permanently attached to the trailer 11, and thus become an integral part of the trailer 11 by methods of fastening such as mechanical fasteners such as bolts, bonding, gluing, welding, or casting as part of the trailer frame. Thus, in the illustrated embodiment, the trailer extension support dolly 1 can be removed from the trailer 11 in instances where the trailer tongue weight can be accommodated by a particular tow vehicle 10 without modification.

The trailer extension support dolly 1 is attached to the trailer 11 so that in essence it becomes an extension of the trailer 11. The ball and socket hitch 12 and the two link arms 14, extending from the dolly frame 15 to the extensions 18 of the trailer hitch bar 17 connect the trailer extension support dolly 1 to the trailer 11. The trailer extension support dolly frame 15 can be rigidly attached to the front of the trailer 11 providing no degree of twisting about the longitudinal axis of the trailer and tow vehicle other than the suspension springs. Alternatively, the link arms 14 can allow some flexibility, as with the use of variable length tie rods 14 or other devices such as spring or gas charged shock absorbers that are joined at their ends by pivotal joints to the trailer and the trailer extension support dolly 1 allowing the trailer extension support dolly 1 to absorb some road twist by pivoting in a limited fashion.

At the front end of the trailer extension support dolly 1, a tongue 20 is depicted as a common triangular tongue 20 terminating in the ball hitch socket 9. The tongue 20 is preferably pivotably attached to the trailer extension support dolly frame 15 via pivot pins 21 such that there can be some pivotal vertical movement of the tongue 20 relative to the tow vehicle 10, especially where the road surfaces are irregular.

The trailer extension support dolly 1 includes a pair of support wheels 24 which are uniquely mounted for castering device. Each wheel 24 is journalled on a stub axle 25 which is part of a knuckle 26 similar to a steering knuckle. The ends of the knuckle 26 are pivotally mounted in the flanges 27 of a generally U-shaped axle support bracket 28. The stub axles 25 are thus free to swivel relative to the bracket 28 to provide a swivel mount such that the attached support wheels 24 are allowed to caster as the wheels of the tow vehicle 10 are turned. An arm 30 extends from the knuckle 26 in a direction consistent on each wheel 24 side to provide for the connection by a tie rod 31 to a similar arm on the corresponding knuckle 26 of the opposite wheel 24. Thus, the wheels 24 are held in parallel alignment while being used. It should be noted that less than two or greater than two wheels 24 can be used in this trailer extension support dolly 1 by slight modification of the mechanical layout if maintaining the trailer wheel track is not a consideration or the trailer extension support dolly 1 is used in the design of the trailer itself.

The axle support bracket 28 extends somewhat beyond the U-shaped portion to provide a mounting arm 33. A cross member 34 similar to an axle extends between the opposite mounting arm 33 and provides a support for connection of each of the knuckles 26 to a set of leaf springs 39 on each side of the trailer retrofit attachment. It should be noted that the leaf springs 39 could be substituted with other devices to provide a springing action such as torsion bars, torque flex devices, coil springs, gas or air bags etc. The leaf springs 39 depicted are fastened to the frame 15 in a known manner to provide suitable springing action to carry the tongue weight of the trailer 11.

Figure 3:
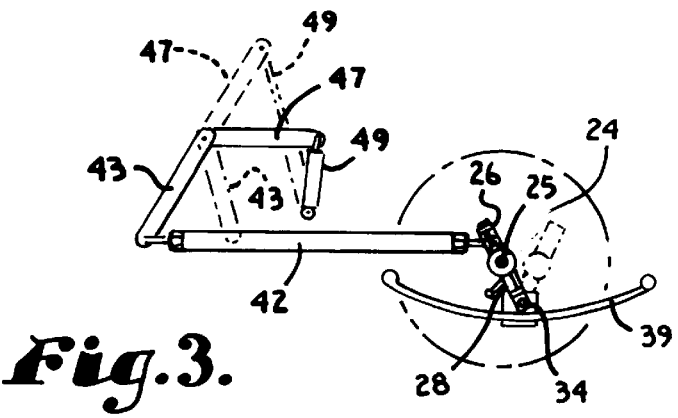
FIG. 3 is a fragmentary, partially schematic side elevation view of the axle support angle adjustment mechanism.
Figure 5:
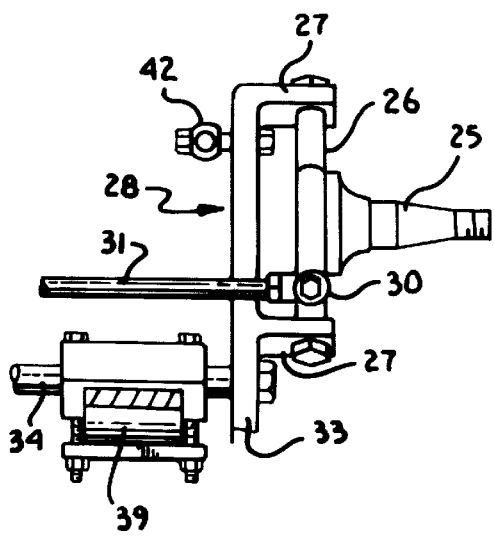
FIG. 5 is a greatly enlarged, fragmentary, cross-sectional view of the left leaf spring, showing the stub axle and axle support, front view of FIG. 4.
Figure 4:
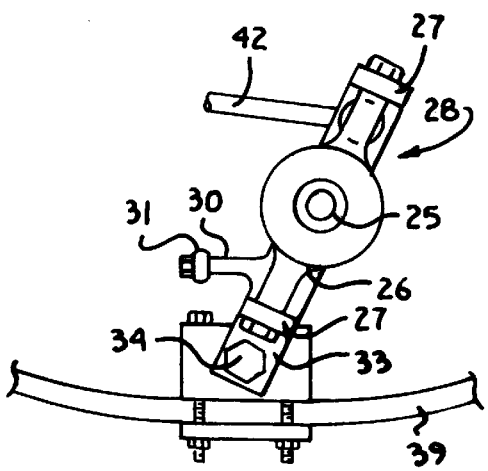
FIG. 4 is a greatly enlarged, fragmentary, elevational view of the left axle support and axle support angle adjustment mechanism attachment point depicted as a side view.

The axle support bracket 28 is connected to the cross member 34 as that it can be pivotally tilted as demonstrated in FIG. 3. The tilting is controlled by a system of levers including a connecting rod 42 for each wheel mounting. Each connecting rod 42 is pivotally attached at one end to a lever 43 and at an opposite end to an upper portion of the axle support bracket 28 (FIG. 4). The levers 43 are fixed to each end of a transverse rod 44. The rod 44 runs transversely on the frame 15 of the trailer extension support dolly 1 and is journalled in bearing blocks 45 on the frame (FIG. 1).

Figure 2:
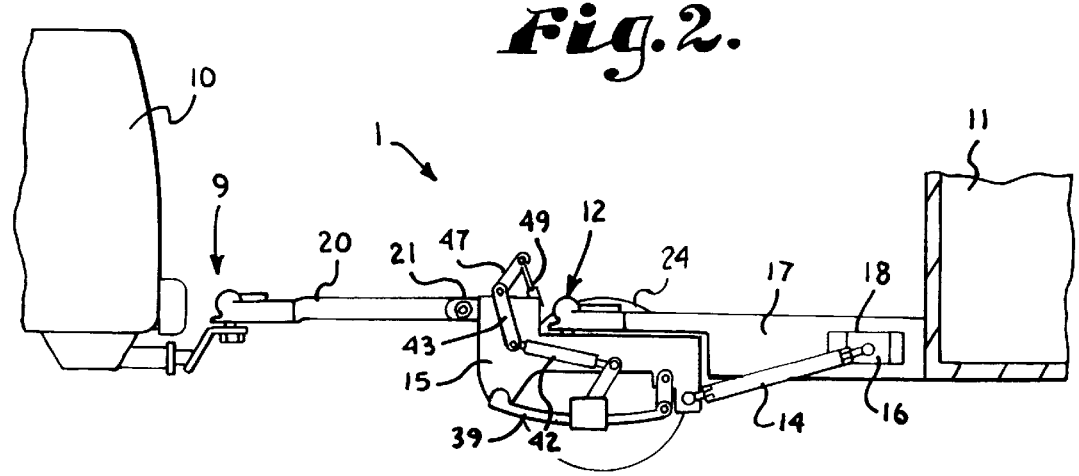
FIG. 2 is a sectional view taken along the line 2—2 of FIG. 1, illustrating the stub axles positioned in a rearward position to allow the wheels to freely caster when the trailer is towed in a forward direction.

Approximately at the middle of the length of the rod 44, a control lever 47 is fixed to the rod to control the position of that rod. By controlling the pivotal position of rod 44, the position of the lever 43 and connecting rod 42 are also controlled. As shown in FIG. 3, the position of those units controls the caster angle at which each of the knuckles 26 is set, and thus can be moved so that each stub axle 25 will be either in front of or behind the cross member 34. If the axles 25 trail that cross member 34, (Position caster angle) the wheels 24 will freely caster as the trailer extension support dolly 1 is pulled forward. Conversely, if the stub axles 25 are positioned forward of the cross member 34, (Negative caster angle) then the wheels 24 will freely caster when the trailer extension support dolly 1 is pushed in reverse. Thus, the trailer extension support dolly 1 can be used just as efficiently going either direction. In FIGS. 1 and 2 the control lever 47 is operated by a small linear actuator device 49. This may be either pneumatic, hydraulic, or electric depending on the availability of the power source. However, it will be obvious to those skilled in the art that an electronically powered device system could be used, or, by lengthening the control lever 47 that manual control lever adjustment would also be possible.

Figure 6:
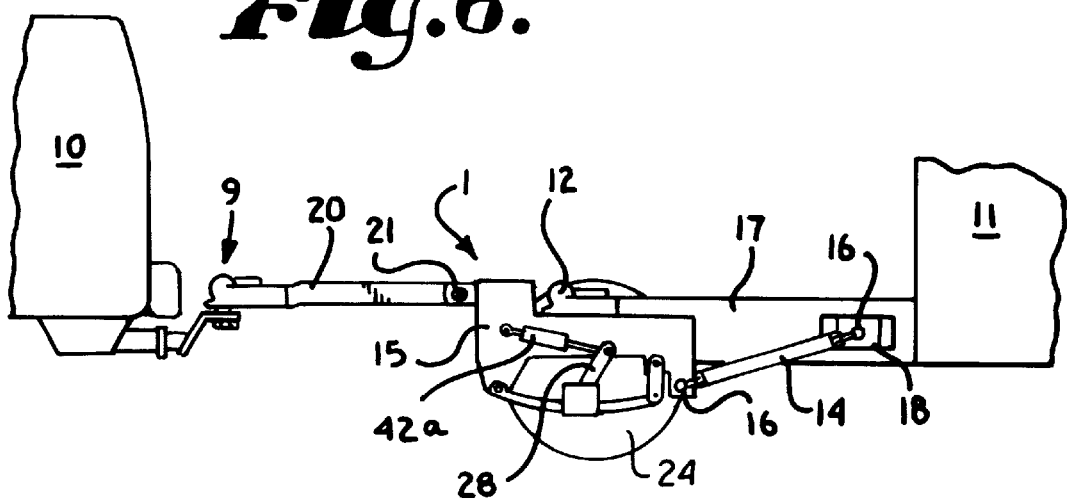
FIG. 6 is a fragmentary, partially schematic side elevation view of a trailer support dolly with an alternative embodiment of axle support angle adjustment mechanism.

It should be noted that many methods can be used to reverse the castering action of the trailer extension support dolly 1, among these are one or more linear actuators 42a, shown here as hydraulic piston and cylinder units (alternatives include pneumatic or electrical actuators) in place of the rods 42, as is shown in FIG. 6. Each linear actuator 42a is pivotally attached at one end to the trailer extension support dolly frame 15 and at an opposite end to an upper portion of the axle support bracket 28. As the length of each linear actuator 42a is adjusted, the pivot angle of the corresponding axle support bracket 28 is also adjusted. Where multiple linear actuators 42a are used, they can be electrically or hydraulically synchronized in a known manner. Another possible variation includes attaching the tops of each axle support bracket 28 to each other and using a single linear actuator to simultaneously adjust the pivot angle of both axle support brackets 28.

Figure 7:
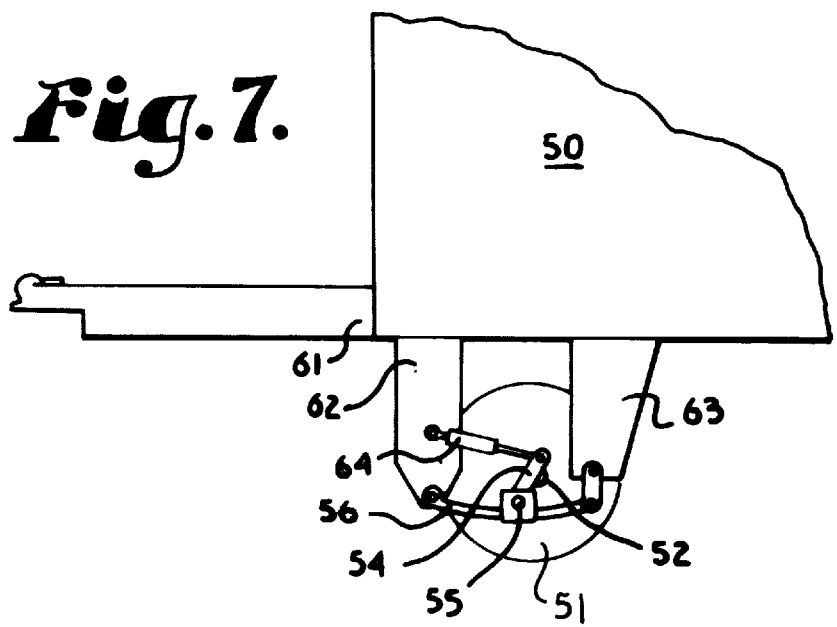
FIG. 7 is a fragmentary, partially schematic side elevational view of a trailer equipped with front support wheels which are free castering and which have axle supports which are adjustable in angle to selectively allow the support wheels to freely caster in either forward or reverse directions.

The invention has been illustrated and described in FIGS. 1–6 in the form of a trailer extension support dolly 1 which provides a retrofit attachment for use when trailer tongue weights exceed the capacity of the tow vehicle. Thus, as a removable retrofit, it can be removed when a tow vehicle is used which can safely support the tongue weight of the towed trailer 11. Alternatively, as illustrated in FIG. 7, instead of a separate trailer extension support dolly 1, a trailer 50 includes a pair of additional support wheels 51 attached to stub axles 52 which are attached, via swivel knuckles to a respective pair of axle support brackets 54. Each axle support bracket 54 is pivotably attached to a cross member 55 which extends between respective suspension springs 56, here shown as leaf springs, which, in turn, are attached beneath a frame 61 of the trailer 50 by respective frame members 62 and 63. A respective one of a pair of linear actuators 64 extends between the trailer frame 62 and each of the axle support brackets 54 such that extension and retraction of the linear actuators 64 selectively changes the angle between the axle support brackets 54 and the cross member 55. The support wheels 51 can be selectively adjusted to freely caster as the trailer 50 is towed forward or pushed rearward by a towing vehicle (not shown). In this manner, the invention can be incorporated directly into the design of the trailer itself such that a trailer designer can be given greater flexibility in locating the trailer support axles based on weight carrying ability or loading of the trailer without regard or worry of exceeding reasonable tongue weight restrictions or limitations. As an incidental advantage of the system as illustrated in FIG. 7, the amount of tongue weight which the trailer 50 will place on a tow vehicle (not shown) is adjusted as the angle of the axle support brackets 54 is adjusted. In other words, when the axle support bracket 54 is vertical (top of the arch) the most amount of tongue weight will be applied to the tow vehicle, as the axle support bracket 54 is moved further in either direction from vertical tongue weight will be removed from the tow vehicle. This incidental advantage can aid in poor traction situations by adding weight to the drive wheels of the tow vehicle. It should be noted that additional tongue weight adjustment can be accomplished by adjusting the distance between the intersection pins of spring 56 and frame members 62 and spring 56 with frame member 63 from the underside of trailer 50 main frame 61 accomplishing the same incidental advantage.

The invention adds to both safety and economy by saving time, mechanical wear and tear and by preventing scuffing of the tires on the trailer extension support dolly support wheels. Certain features of the invention trailer extension support dolly 1 of FIGS. 1–6 and the alternative integral trailer design illustrated in FIG. 7, are to be considered to be examples only. For example, the specific swiveling attachment of stub axles 25 and 52 to the axle support brackets 28 and 54 are exemplary only and other swiveling systems could be used. Furthermore, the shapes 39 and 56, the location of the support wheels 24 and 51 along the length of the trailer frame 61, and other features can be charged without affecting the viability of the invention illustrated and described herein, it is not to be limited to the specific forms or arrangement of parts described and shown.

I claim:

1. A support which at least partially carries the tongue weight of a trailer, said support comprising:
   a. a frame;
   b. an axle support bracket connected to said frame and pivotable with respect to said frame about a first pivot axis;
   c. a knuckle including a stub axle, said knuckle being attached to said axle support bracket such that said knuckle is free to pivot with respect to said axle support bracket about a second pivot axis, said second pivot axis being oriented non-concentrically with said first pivot axis and at a caster angle with respect to vertical;
   d. a support wheel rotatably connected to said stub axis, said support wheel being free to caster about said pivot axis with said knuckle, and;
   e. an adjustment mechanism connected between said dolly frame and said axle support bracket, said adjustment mechanism being selectively operable to vary the caster angle of said knuckle.

2. A support as in claim 1, wherein said frame forms a portion of a dolly which is removably connectable between a tow vehicle and the trailer.

3. A support as in claim 2, wherein said dolly frame includes:
   a. a hitch receiver which is connectable to a hitch bar of the trailer; and
   b. a pair of link arms extending between the dolly frame and respective sides of the trailer hitch bar.

4. A support as in claim 3, wherein said dolly frame further includes:
   a. a hitch bar which is connectable to a hitch receiver of the tow vehicle.

5. A support as in claim 2, wherein there are two of said support wheels, knuckles, and axis support brackets, said adjustment mechanism being selectively operable to simultaneously vary the caster angle of both said knuckles.

6. A support as in claim 5, wherein said adjustment mechanism comprises a linear actuator which is connected to said dolly frame and to both axle support brackets via a leveraged linkage system.

7. A support as in claim 5, wherein said adjustment mechanism comprises a pair of linear actuators, each of which is connected between a respective one of said side support brackets and said dolly frame.

8. A support as in claim 1, wherein said frame is and an integral part of the trailer.

9. A support as in claim 8, wherein there are two of said support wheels, knuckles, and axle support brackets, said adjustment mechanism being selectively operable to simultaneously vary the caster angle of both said knuckles.

10. A support as in claim 9, wherein said adjustment mechanism comprises a pair of linear actuators, each of which is connected between a respective one of said axle support brackets and said frame.

11. A support as in claim 8, wherein said adjustment mechanism also varies the amount of tongue weight incident on the tow vehicle as it varies the caster angle of said knuckles.

12. A support as in claim 8, wherein said adjustment mechanism comprises a linear actuator which is connected to said frame and to said axle support bracket.

13. A support dolly which at least partially carries the tongue weight of a trailer, said support dolly comprising:
   a. a dolly frame which is connectable between a low vehicle and a the trailer;
   b. an axle support bracket connected to said dolly frame and pivotable with respect to said dolly frame about a first pivot axis;
   c. a knuckle including a stub axle, said knuckle being attached to said axle support bracket such that said knuckle is free to pivot with respect to said axle support bracket about a second pivot axis, said second pivot axis being oriented non-concentrically with said first pivot axis and at a caster angle with respect to vertical;
   d. a support wheel rotatably connected to said stub axis, said support wheel being free to caster about said pivot axis with said knuckle, and;
   e. an adjustment mechanism connected between said dolly frame and said axle support bracket, said adjustment mechanism being selectively operable to vary the caster angle of said knuckle.

14. A support dolly as in claim 13, wherein said dolly frame includes:
   a. a hitch receiver which is connectable to a hitch bar of the trailer, and
   b. a pair of link arms extending between the dolly frame and respective sides of the trailer hitch bar; and
   c. a hitch bar which is connectable to a hitch receiver of the tow vehicle.

15. A support dolly as in claim 13, wherein there are two of said support wheels, knuckles and axle support brackets, said adjustment mechanism being selectively operable to simultaneously vary the caster angle of both said knuckles.

16. A support dolly as in claim 15, wherein said adjustment mechanism comprises a linear actuator which is connected to said dolly frame and to both axle support brackets via a leveraged linkage system.

17. A support dolly as in claim 15, wherein said adjustment mechanism comprises a pair of linear actuators, each of which is connected between a respective one of said axle support brackets and said dolly frame.

18. A support dolly as in claim 16 wherein said leveraged linkage systems comprises:
   a. a transverse control rod pivotally connected to said frame and having first and second ends;
   b. first and second levers fixedly secured to said first and second control rod ends respectively and extending radially outwardly therefrom;
   c. a control lever fixedly secured to said control rod intermediate said first and second ends and extending radially outwardly therefrom, said control lever being connected to said linear actuator;
   d. first and second connecting rods, said first connecting rod being pivotally connected to said first level and to one of said axle support brackets, said second connecting rod being pivotally connected to said second lever and to the other of said axle support brackets.

19. A support which at least partially carries the weight of a trailer, said support comprising:
   a. a frame which forms an integral part of the trailer;
   b. an axis support bracket connected to said frame and pivotable with respect to said frame about a first pivot axis;
   c. a knuckle including a stub axle, said knuckle being attached to said axle support bracket such that said knuckle is free to pivot with respect to said axle support bracket about a second pivot axis, said second pivot axis being oriented non-concentrically with said first pivot axis and at a caster angle with respect to vertical;
   d. a support wheel rotatably connected to said stub axis, said support wheel being free to caster about said pivot axis with said knuckle, and;
   d. an adjustment mechanism connected between said frame and said axle support bracket, said adjustment mechanism being selectively operable to vary the caster angle of said knuckle.

20. A support as in claim 19, wherein there are two of said support wheels, knuckles, and axle support brackets, said adjustment mechanism being selectively operable to simultaneously vary the caster angle of both said knuckles.

21. A support as in claim 20, wherein said adjustment mechanism comprises a pair of linear actuators, each of which is connected between a respective one of said axle support brackets and said frame.

22. A support as in claim 20, wherein said adjustment mechanism also varies the amount of tongue weight incident on the tow vehicle as it varies the caster angle of said knuckles.

* * * * *